(12) United States Patent
Cecchi et al.

(10) Patent No.: US 6,304,106 B1
(45) Date of Patent: Oct. 16, 2001

(54) CMOS BI-DIRECTIONAL CURRENT MODE DIFFERENTIAL LINK WITH PRECOMPENSATION

(75) Inventors: Delbert Raymond Cecchi, Rochester; Charles C. Hanson, Kenyon; Curtis Walter Preuss, Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/506,754

(22) Filed: Feb. 18, 2000

(51) Int. Cl.[7] .................. H03K 19/094; H04B 1/44; H04B 1/38
(52) U.S. Cl. ................. 326/86; 326/86; 326/30; 370/282; 370/284; 375/219
(58) Field of Search .................. 326/30, 81, 86, 326/90; 370/276, 282, 284; 375/219, 220

(56) References Cited

U.S. PATENT DOCUMENTS 5,666,354   9/1997   Cecchi et al. .
5,778,204 * 7/1998   Van Brunt et al. .................. 395/308
5,900,752 * 5/1999   Mar ....................................... 327/143
6,184,714 * 2/2001   Kirsch et al. ........................... 326/60

* cited by examiner

Primary Examiner—Michael Tokar
Assistant Examiner—Vibol Tan
(74) Attorney, Agent, or Firm—Joan Pennington

(57) ABSTRACT

A Complementary Metal Oxide Semiconductor (CMOS) current mode differential link with precompensation is provided. The Complementary Metal Oxide Semiconductor (CMOS) bi-directional current mode differential link with precompensation includes a CMOS driver receiving a data input and having an output coupled to a transmission line. A CMOS replica driver receives the data input and provides a replica driver output substantially equal to the CMOS driver output. A CMOS receiver is coupled to both the transmission line and replica driver output. The CMOS receiver subtracts the replica driver output from a signal at the transmission line. The CMOS driver and the CMOS replica driver include a plurality of parallel current sources. Each of the current sources is arranged to send positive or negative current through a load responsive to an applied control signal. The use of the plurality of parallel current sources allows the CMOS driver to effectively implement precompensation. The output current of the CMOS driver is a function of a data bit and at least one previous data bit.

16 Claims, 4 Drawing Sheets

CMOS BI-DIRECTIONAL CURRENT MODE DIFFERENTIAL LINK WITH PRECOMPENSATION

FIELD OF THE INVENTION

The present invention relates to a Complementary Metal Oxide Semiconductor (CMOS) bi-directional current mode differential link with precompensation.

DESCRIPTION OF THE RELATED ART

U.S. Pat. No. 5,666,354 issued Sep. 9, 1997 and assigned to the present assignee, discloses a full-duplex, differential, bi-directional communications link for simultaneously transmitting differential data between electronic devices. Each transceiver coupled to the communications channel comprises a Complementary Metal Oxide Semiconductor (CMOS) differential driver and receiver. The differential driver provides constant CMOS voltage sources for providing stable data signal transmission at reduced voltage levels. Voltage sources providing a data signal voltage different from the desired data signal voltage can be placed into a high impedance mode to allow the desired data signal voltage to be transmitted on the common line. The differential receiver includes self-biasing feedback circuitry to provide biasing voltages to the circuit while avoiding manufacturing difficulties associated with providing precise bias voltages. The complementary amplifier structure of the receiver provides an increased common mode noise tolerance. The receiver further includes signal separation circuitry to separate the desired recipient signals on the communications channel from those signals which are driven to another differential receiver on the far end.

While the above-identified U.S. patent overcomes many disadvantages of conventional arrangements, a need exists for a Complementary Metal Oxide Semiconductor (CMOS) bi-directional current mode differential link with precompensation.

SUMMARY OF THE INVENTION

A principal object of the present invention is to provide a Complementary Metal Oxide Semiconductor (CMOS) bi-directional current mode differential link with precompensation. Other important objects of the present invention are to provide such a Complementary Metal Oxide Semiconductor (CMOS) bi-directional current mode differential link with precompensation substantially without negative effect; and that overcomes many of the disadvantages of prior art arrangements.

In brief, a Complementary Metal Oxide Semiconductor (CMOS) current mode differential link with precompensation is provided. The Complementary Metal Oxide Semiconductor (CMOS) bi-directional current mode differential link with precompensation includes a CMOS driver receiving a data input and having an output coupled to a transmission line. A CMOS replica driver receives the data input and provides a replica driver output substantially equal to the CMOS driver output. A CMOS receiver is coupled to both the transmission line and replica driver output. The CMOS receiver subtracts the replica driver output from a signal at the transmission line. The CMOS driver and the CMOS replica driver include a plurality of parallel current sources. Each of the current sources is arranged to send positive or negative current through a load responsive to an applied control signal.

In accordance with features of the invention, the use of the plurality of parallel current sources allows the CMOS driver to effectively implement precompensation. The output current of the CMOS driver is a function of a data bit and at least one previous data bit.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
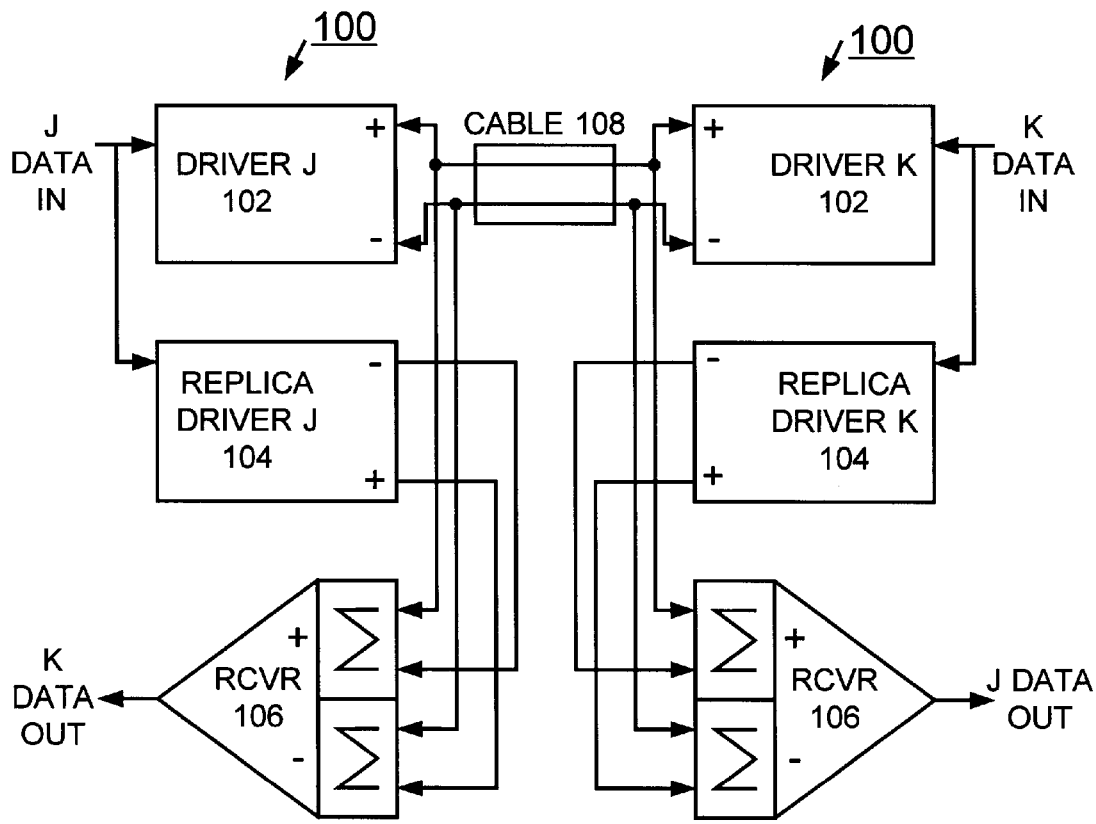
FIG. 1 is a block diagram representation illustrating a Complementary Metal Oxide Semiconductor (CMOS) bi-directional current mode differential link with precompensation in accordance with the preferred embodiment.

Having reference now to the drawings, in FIG. 1, there is shown a Complementary Metal Oxide Semiconductor (CMOS) bi-directional current mode differential link with precompensation of the preferred embodiment generally designated by the reference character 100. The CMOS bi-directional current mode differential link 100 includes a driver 102 and a replica driver 104. Driver 102 and replica driver 104 are connected to a receiver 106. As shown in FIG. 1, a differential wire pair cable 108 connects two CMOS bi-directional current mode differential links 100. CMOS bid-directional current mode differential link 100 provides for simultaneous bi-directional signaling over the differential wire pair. CMOS bi-directional current mode differential link 100 also supports conventional uni-directional signaling and can be operated with known remote input/output (RIO) channels.

In accordance with features of the preferred embodiment, precompensation is used to counteract signal attenuation due to transmission lines. Precompensation or transmitter equalization is used to reduce inter symbol interference due to the effects of cable attenuation. Skin effect attenuation on copper transmission lines will distort data pulses. This attenuation is frequency dependent and affects both the amplitude and phase of the transmitted signal. The effect is to reshape the data pulses and smear them in time so that adjacent bits overlap and interfere at the receiving end of the cable. The arrival time of each bit becomes dependent on the preceding bit pattern. The ISI or pattern dependent jitter becomes very pronounced with long wires and high frequency data streams. Typically a high pass filter cascaded with the cable has been used to equalize the frequency response of the channel and reduce the pulse distortion.

Figure 2:
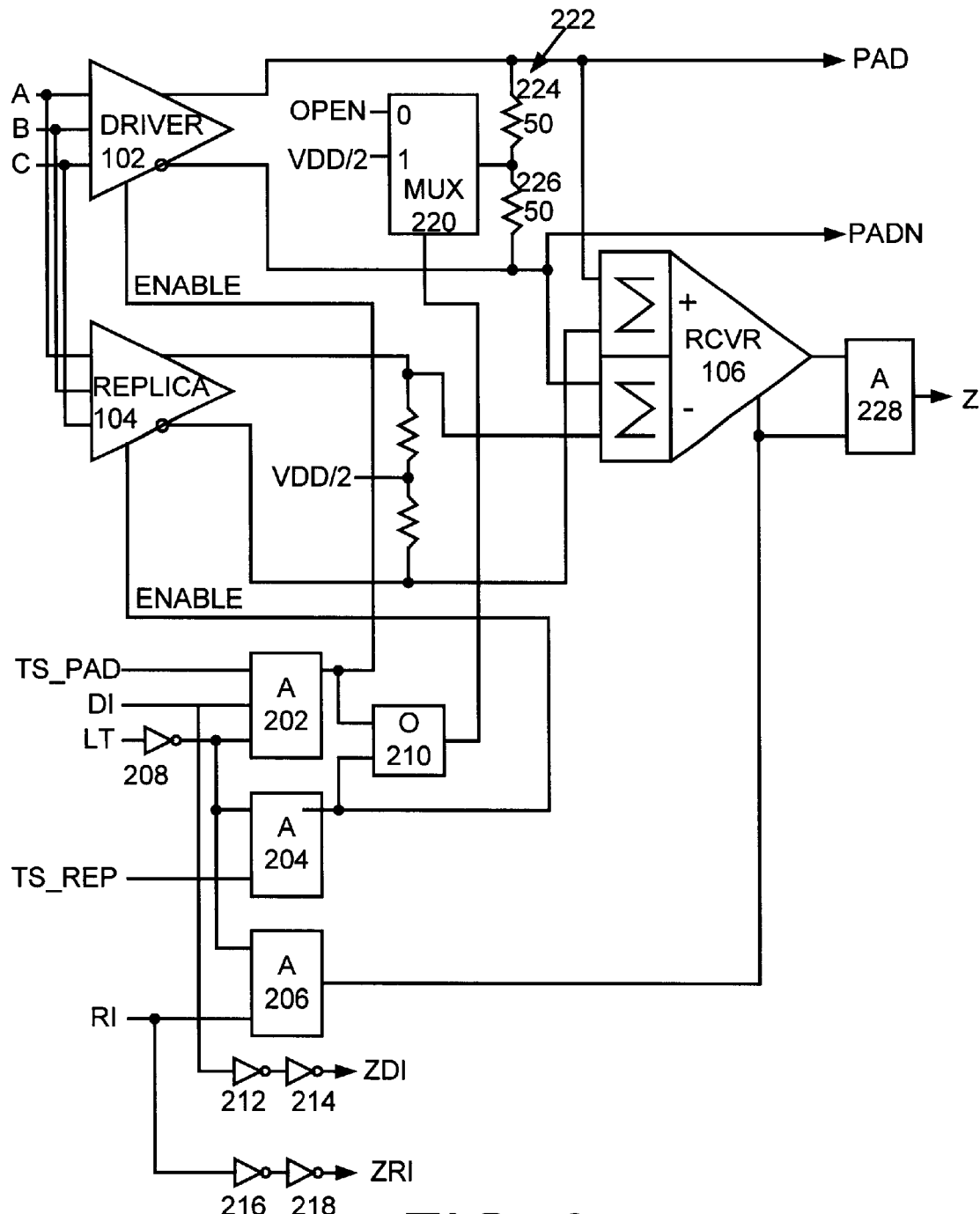
FIG. 2 is a block diagram representation illustrating a driver, replica driver and receiver of the CMOS bi-directional current mode differential link with precompensation of FIG. 1 in accordance with the preferred embodiment.

Referring also to FIG. 2, there is shown the CMOS bi-directional current mode differential link 100 of the preferred embodiment. Inputs A, B, C are applied to the driver 102 and replica driver 104. Input A represents driver data bit (N). Input B represents driver data bit (N−1) and input C represents driver data bit (N−2). A plurality of signals T_PAD (Enable PAD Driver), DI (Driver Inhibit), LT (Leak Test), TS_REP (Enable Replica Driver), and RI (Receiver Inhibit) respectively, are applied to a plurality of AND gates 202, 204, 206. The LT signal is coupled to AND gate 202 via an inverter 208. Outputs of AND gates 202 and 204 are applied to an OR gate 210. A buffered copy of the DI input ZDI is provided at the output of a pair of series connected inverters 212, 214. A buffered copy of the RI input ZRI is provided at the output of a pair of series connected inverters 216, 218. The output of OR gate 210 provides a control input to a multiplexer 220. A 100 ohm terminator 222 formed by a pair of series connected 50 ohm resistors 224 and 226 is connected between + and − driver output pins PAD, PADN. Multiplexer 220 provides an open or a voltage VDD/2 at the junction of series connected 50 ohm resistors 224 and 226 responsive to the control input to multiplexer 220.

The voltage across the terminator 222 is due to the sum of currents from both the near and the far driver 102. The receiver 106 on either end subtracts the voltage due to the near driver 102 from the total voltage across the terminator 222, leaving the voltage due to the far driver 102. The receiver output Z of an AND gate 228 is:

$$Z=(PAD+REPN)-(PADN+REP)$$

If the differential voltage from the incoming signal is positive, a "1" is being received. It the differential voltage from the incoming signal is negative, a "0" is being received.

For non-bidirectional operation with operation as a receiver the line driver 102 and replica driver 104 are tristated. This sets the line driver 102 to a high impedance and sets both the replica outputs equal to the nominal common mode voltage. In this condition the receiver 106 ignores the replica driver 104 and functions as a normal differential receiver. For driver wrap test separate tristate pins are provided for the line driver 102 and replica driver 104 which allows the replica driver 104 or driver 102 to be set to the common mode. The receiver 106 then tracks the non-tristated driver. The following Table 1 defines the functions of the driver tri-state pins. In Table 1, CM represents common mode voltage and A represents driver data input.

TABLE 1

Use of Driver Tri State Pins

| TS_REP | TS-PAD | PAD | PDAN | REP | REPN | COMMENT |
|---|---|---|---|---|---|---|
| 0 | 0 | Hi-Z | Hi-Z | CM | CM | Uni-Receiver |
| 0 | 1 | A | not A | CM | CM | Uni-Driver, Wrap Test Line Driver |
| 1 | 0 | CM | CM | A | not A | Wrap Test-Replica Driver |
| 1 | 1 | A | not A | A | not A | Bi-di operation |

Figure 3:
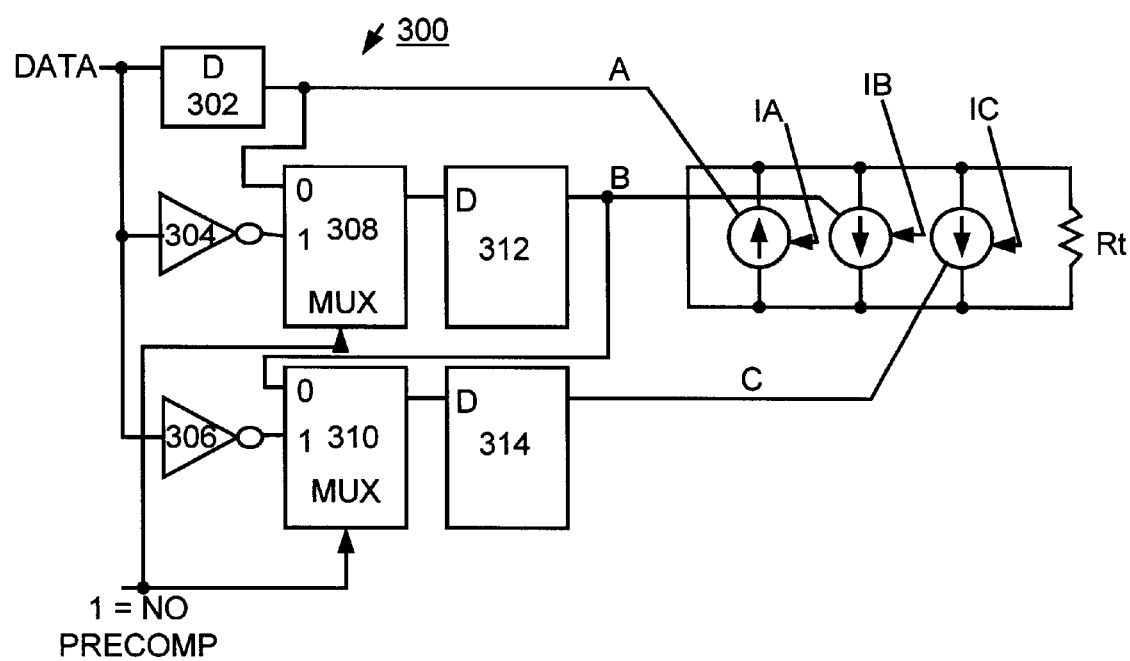
FIG. 3 is a schematic representation of a precompensation implementation of the differential link of FIGS. 1 and 2 in accordance with the preferred embodiment.

Referring to FIG. 3, an exemplary precompensation mode logic generally designated by the reference character 300 is shown together with a plurality of parallel current sources IA, IB, and IC. Precompensation mode logic 300 includes a D latch 302 and a pair of inverters 304 and 306 receiving a data input. D latch 302 provides an output A applied to current source IA. A first multiplexer 308 of a pair of multiplexers 308 and 310 is connected to the outputs of D latch 302 and inverter 304. The output of multiplexer 308 is coupled to an input of multiplexer 310 via a D latch 312 providing an output B applied to current source IB. The output of multiplexer 310 is applied to a D latch 314 providing an output C applied to current source IC. Latch 314 provides the output of the latch 312 or the inverted data. A 1 input is applied to multiplexers 308 and 310 to select no precompensation. Driver 102 can implement the following equation in precompensation mode:

$$1.4y(n)=x(n)-0.32x(n-1)-0.12x(n-2),$$

where the driver output current y during clock cycle n is a function of data bit x and the previous two bits. Precompensation mode logic 300 provides the inputs A=x(n), B=x(n−1) and C=x(n−2). To disable precompensation, the inputs are driven so that A=x(n) and B=C=inverse of A. The scaling and summing operations are done in driver 102 using the current sources IA, IB, IC in parallel with the terminator resistor Rt. The direction of the current source is controlled by the A, B, and C inputs. The current sources IA, IB, IC can provide, for example, 6.24 mA, 1.28 mA, and 0.48 mA. Note that the A input dominates, so the logical, 0 or 1, output of the driver 102 is not a function of the B and C inputs. With these coefficients, the driver precompensation can replace the passive equalizer filter used for known channels.

Figure 4:
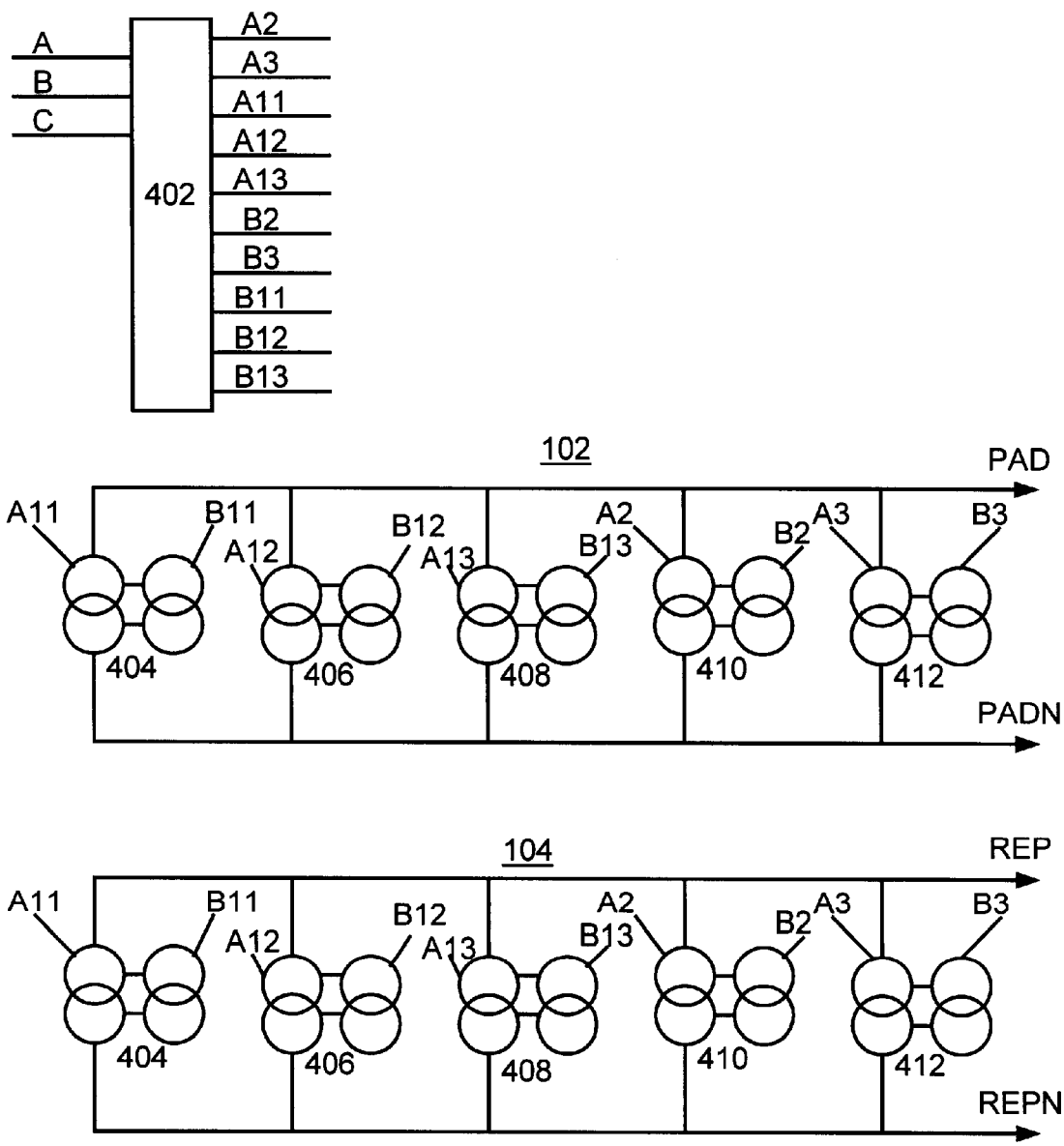
FIG. 4 is a schematic and block diagram representation of a driver and replica driver including a precompensation implementation in accordance with the preferred embodiment.

Referring to FIG. 4, there is shown an exemplary block diagram representation of the driver 102 and replica driver 104. A predriver block 402 receives the inputs A, B, and C and generates respective complementary delayed signals. Predriver block 402 generates complementary delayed signals A11 and B11; A12 and B12; and A13 and B13 responsive to input A. Responsive to input B, predriver block 402 generates complementary delayed signals A2 and B2. Responsive to input C, predriver block 402 generates complementary delayed signals A3 and B3. Driver 102 and replica driver 104 include a plurality of parallel current sources 404, 406, 408, 410 and 412. Each of the parallel current sources 404, 406, 408, 410 and 412 is arranged to send positive or negative current through the load responsive to the applied complementary delayed signals A11, B11; A12, B12; and A13, B13; A2, B2; and A3, B3. Parallel current sources 404, 406, 408 are turned on in sequence or in stages by the applied complementary delayed signals A11, B11; A12, B12; and A13, B13 to avoid excessive noise.

In operation, precompensation mode output current can equal the sum of currents of current sources 404, 406, 408 plus the current sources 410 and 412. The output current can equal the sum of currents of current sources 404, 406, 408 minus the current source 410 plus the current source 412. The output current can equal the sum of currents of current sources 404, 406, 408 minus the current source 410 minus the current source 412. The output current can equal the sum of currents of current sources 404, 406, 408 plus the current source 410 minus the current source 412.

While the present invention has been described with reference to the details of the embodiments of the invention shown in the drawing, these details are not intended to limit the scope of the invention as claimed in the appended claims.

What is claimed is:

1. A Complementary Metal Oxide Semiconductor (CMOS) bi-directional current mode differential link with precompensation comprising:

a CMOS driver receiving a data input and having an output coupled to a transmission line;

a CMOS replica driver receiving said data input and providing a replica driver output substantially equal to said CMOS driver output;

a CMOS receiver coupled to both said transmission line and replica driver output; said CMOS receiver subtracting said replica driver output from a signal at said transmission line; and said CMOS driver and said CMOS replica driver including a plurality of parallel current sources; each of said current sources being arranged to send positive or negative current through a load responsive to an applied control signal.

2. A Complementary Metal Oxide Semiconductor (CMOS) bi-directional current mode differential link with precompensation as recited in claim 1 wherein said applied control signal includes driver data inputs.

3. A Complementary Metal Oxide Semiconductor (CMOS) bi-directional current mode differential link with precompensation as recited in claim 2 wherein said driver data inputs include inputs A, and B; where input A equals driver data bit (N), and input B equals driver data bit (N−1).

4. A Complementary Metal Oxide Semiconductor (CMOS) bi-directional current mode differential link with precompensation as recited in claim 2 wherein said driver data inputs include inputs A, B and C; where input A equals driver data bit (N), input B equals driver data bit (N−1) and input C equals driver data bit (N−2).

5. A Complementary Metal Oxide Semiconductor (CMOS) bi-directional current mode differential link with precompensation as recited in claim 1 wherein said load includes a terminator resistor connected across said output of said CMOS driver.

6. A Complementary Metal Oxide Semiconductor (CMOS) bi-directional current mode differential link with precompensation as recited in claim 1 includes means for disabling precompensation.

7. A Complementary Metal Oxide Semiconductor (CMOS) bi-directional current mode differential link with precompensation as recited in claim 1 includes tristate means for CMOS driver only operation.

8. A Complementary Metal Oxide Semiconductor (CMOS) bi-directional current mode differential link with precompensation as recited in claim 1 includes tristate means for CMOS receiver only operation.

9. A Complementary Metal Oxide Semiconductor (CMOS) bi-directional current mode differential link with precompensation as recited in claim 1 wherein said transmission line comprises a differential wire pair.

10. A Complementary Metal Oxide Semiconductor (CMOS) bi-directional current mode differential link with precompensation as recited in claim 1 wherein said applied control signal includes complementary delayed driver data input signals.

11. A Complementary Metal Oxide Semiconductor (CMOS) bi-directional current mode differential link with precompensation as recited in claim 10 wherein said plurality of parallel current sources are turned on in sequence by said complementary delayed driver data input signals.

12. A Complementary Metal Oxide Semiconductor (CMOS) bi-directional current mode differential link with precompensation as recited in claim 1 wherein said driver data inputs include inputs A, B and C; where input A equals driver data bit (N), input B equals driver data bit (N−1) and input C equals driver data bit (N−2) and wherein said input A dominates so that said output of said CMOS driver is not a function of said inputs B and C.

13. A Complementary Metal Oxide Semiconductor (CMOS) bi-directional current mode differential link with precompensation as recited in claim 1 wherein said transmission line includes a second end and a second CMOS bi-directional current mode differential link is connected to said second end.

14. A Complementary Metal Oxide Semiconductor (CMOS) bi-directional current mode differential link with precompensation as recited in claim 13 wherein said second CMOS bi-directional current mode differential link includes a CMOS driver, a CMOS replica driver and a CMOS receiver.

15. A Complementary Metal Oxide Semiconductor (CMOS) bi-directional current mode differential link with precompensation comprising:

a transmission line;

a CMOS driver receiving a data input and having an output coupled to said transmission line;

a CMOS replica driver receiving said data input and providing a replica driver output substantially equal to said CMOS driver output;

a CMOS receiver coupled to both said transmission line and replica driver output; said CMOS receiver subtracting said replica driver output from a signal at said transmission line; and said CMOS driver and said CMOS replica driver including a plurality of parallel current sources; each of said current sources being arranged to send positive or negative current through a load responsive to an applied control signal; said applied control signal including driver data inputs A, B and C; where input A equals driver data bit (N), input B equals driver data bit (N−1) and input C equals driver data bit (N−2).

16. A Complementary Metal Oxide Semiconductor (CMOS) bi-directional current mode differential link with precompensation as recited in claim 15 wherein said load includes a terminator resistor connected across said output of said CMOS driver.

* * * * *